United States Patent [19]

Barton et al.

[11] Patent Number: 4,644,877

[45] Date of Patent: Feb. 24, 1987

[54] PLASMA PYROLYSIS WASTE DESTRUCTION

[75] Inventors: Thomas G. Barton, Kingston; Edward S. Fox, Welland, both of Canada

[73] Assignee: Pyroplasma International N.V., Philipsburg, Netherlands Antilles

[21] Appl. No.: 611,541

[22] Filed: May 17, 1984

[30] Foreign Application Priority Data

Jan. 23, 1984 [CA] Canada .................................. 445887

[51] Int. Cl.⁴ ........................... F23G 5/10; F23G 5/12
[52] U.S. Cl. ............................... 110/250; 422/186.23; 422/186.25; 204/165; 110/346; 110/215
[58] Field of Search ....................... 422/186.21, 186.22, 422/186.23, 186.25; 204/165, 162 R, 162 HE, 162 XN; 110/210, 211, 214, 215, 216, 346, 250

[56] References Cited

U.S. PATENT DOCUMENTS

| | | | |
|---|---|---|---|
| 3,515,519 | 6/1970 | Sennewald | 422/186.22 |
| 3,533,756 | 10/1970 | Houseman | 23/294 R |
| 3,622,493 | 11/1971 | Crusco | 422/186.23 |
| 3,780,675 | 12/1973 | Frye et al. | 110/215 |
| 3,832,519 | 8/1974 | Wolf et al. | 219/121 P |
| 3,840,750 | 10/1974 | Davis | 422/186.25 |
| 4,078,503 | 3/1978 | Van Dreusche | 110/216 X |
| 4,214,736 | 7/1980 | Wolf et al. | 266/200 |
| 4,431,612 | 2/1984 | Bell et al. | 422/186.21 |
| 4,438,706 | 3/1984 | Boday et al. | 110/238 |
| 4,481,889 | 11/1984 | Sikander | 110/214 |
| 4,509,434 | 4/1985 | Boday | 110/215 X |
| 4,517,906 | 5/1985 | Lewis et al. | 110/210 |

FOREIGN PATENT DOCUMENTS 8200509 2/1982 European Pat. Off. .
2018812 10/1979 United Kingdom .

OTHER PUBLICATIONS

*Hazardous Waste Processing Technology* Kiang, Yen-Hsiung and Metry, Amir A., Ann Arbor Science "Plasma Arc Pyrolysis" pp. 341–343 6/1982.
"Problem Waste Disposal by Plasma Heating" Bartan, Thomas G. Recycling Berlin '79 volume 1, pp. 733–736.
"Ultimate Disposal of PCB's" Barton, T. G., Phd. and Arsenault, G. P. Phd., American Chemical Society, Div. of Environmental Chemistry 182nd Nat. Mfg. Aug. 1981 vol. 21 No. 2 pp. 54–56.
"Plasma Pyrolysis of Toxic Wastes" Barton, T. G., Proceedings: 1981 PCB Seminar 9/19/81, pp. 4-1-5-4-32.
"Ultimate Disposal of Polychlorinated Biphenyls" Barton, T. G., and Arsenault, G. P. *Detoxication of Hazardous Waste* Chapter 10 Ann Arbor Science pp. 185–199.
Hawley, Gessner, The Condensed Chemical Dictionary.

*Primary Examiner*—Edward A. Miller
*Assistant Examiner*—Susan Wolffe
*Attorney, Agent, or Firm*—Wegner & Bretschneider

[57] ABSTRACT

A method and apparatus are disclosed for the pyrolytic destruction of toxic or hazardous waste materials using equipment that is compact and transportable. The waste materials are fed into a plasma arc burner where they are atomized and ionized, and then discharged into a reaction chamber to be cooled and recombine into product gas and particulate matter. The recombined products are quenched using a spray ring attached to the reaction vessel. An alkaline atomized spray produced by the spray ring neutralizes the recombined products and wets the particulate matter. The product gas is then extracted from the recombining products using a scrubber, and the product gas is then burned or used for fuel. Monitoring devices are used to check the recombined products and automatically shut down the apparatus if hazardous constituents are encountered therein.

31 Claims, 6 Drawing Figures

PLASMA PYROLYSIS WASTE DESTRUCTION

BACKGROUND OF THE INVENTION

This invention relates to the pyrolytic destruction of waste materials, and in particular, to a method and apparatus for disposing of toxic or hazardous materials, such as polychlorinated biphenyls (PCB's).

There are a growing number of toxic or hazardous compounds the use of which is being withdrawn or prohibited because of irreversible harm to health or the environment. These materials must be managed and disposed of effectively. In addition to polychlorinated biphenyls, there are also organophosphorous, organonitrogen and organometallic compounds, as well as other materials, that exist in massive quantities and demand effective means of disposal. The majority of the toxic compounds are in a composite matrix format often combining organic and inorganic components or fractions, and in these cases, little or no disposal technology is available. PCB laden capacitors are a good example of a composite matrix waste requiring safe and efficient disposal methods.

Various methods have been tried for disposing of toxic wastes, including thermal destruction, chemical detoxification, long-term encapsulation and specific land fill methods. With the exception of high temperature incineration, little success has been demonstrated for the safe disposal of highly toxic or extremely persistent wastes, such as PCB's. The methods that have been tried have either not been able to handle anything but homogeneous waste feeds streams, or they have only been able to handle relatively low concentrations of toxic compounds in the waste materials. Further, very few of the disposal methods tried to date have been able to be developed to operate on a commercial scale, because it generally has not been possible to demonstrate to the various regulatory agencies that the disposal methods used in the past have been completely safe.

Of the many methods tried for the disposal of toxic or hazardous wastes, thermal destruction has been the most promising. However, the toxic waste materials are usually very stable organic molecules, and they require long dwell times at high temperatures to effect thermal destruction. Some combustion or incineration systems can achieve the necessary conditions, but the facilities required are very large scale, and often the products of the combustion process present as much of a disposal problem as the original toxic wastes.

In the past, attempts have been made to use electric plasma arcs to destroy toxic wastes. An electric plasma arc system, being essentially pyrolytic, overcomes many of the deficiencies of an incineration or combustion process, in that the volume of gaseous products produced is much less, so the equipment is substantially smaller in scale. Laboratory demonstrations have shown that a plasma arc is capable of atomizing and ionizing toxic organic compounds, and that these atoms and ions usually recombine into simple products. While residual toxic materials are formed, these can be captured, so that no significant amount of toxic materials is released to the environment.

Until the present invention, however, there has not been produced a commercially viable method for the pyrolytic destruction of waste materials with sufficiently high reliability and efficiency to satisfy regulatory authorities that this method of waste destruction is safe.

SUMMARY OF THE INVENTION

The present invention uses a plasma arc device to ionize and atomize waste materials, but then neutralizes and cleans the recombined products in a simple and cost effective manner with sufficiently high efficiency to be considered environmentally safe.

According to one aspect of the invention, there is provided a method for the pyrolytic destruction of waste materials comprising the steps of subjecting the waste material to a high temperature plasma arc to atomize and ionize the waste material. The atomized and ionized waste material is then cooled in a reaction chamber to form recombined products including product gas and particulate matter. The recombined products are quenched with an alkaline atomized spray to neutralize same and wet the particulate matter. The product gas is extracted from the recombined products, and the extracted product gas is burned.

According to another aspect of the invention apparatus is provided for the pyrolytic destruction of waste materials. The apparatus comprises a plasma burner including at least two co-linear hollow electrodes and means for stabilizing a plasma arc therebetween. A power supply is connected to the electrodes to produce the plasma arc, and cooling means are provided for cooling the electrodes. A reaction vessel is connected to the plasma burner and has a refractory lined reaction chamber for receiving the plasma arc. Means are provided for inserting waste material into the plasma arc to be atomized and ionized and then recombined into recombined products in the reaction chamber. The reaction vessel includes an outlet for removing the recombined products therefrom. A spray ring communicates with the reaction vessel outlet. A pressurized supply of alkaline fluid is connected to and communicates with the spray ring for quenching and neutralizing the recombined products. A scrubber communicates with output of the spray ring for separating product gas from liquid particulate matter in the recombined products, and means are coupled to the scrubber for removing the liquid particulate matter and product gas therefrom.

DETAILED DESCRIPTION OF PREFERRED EMBODIMENT

Figure 1:
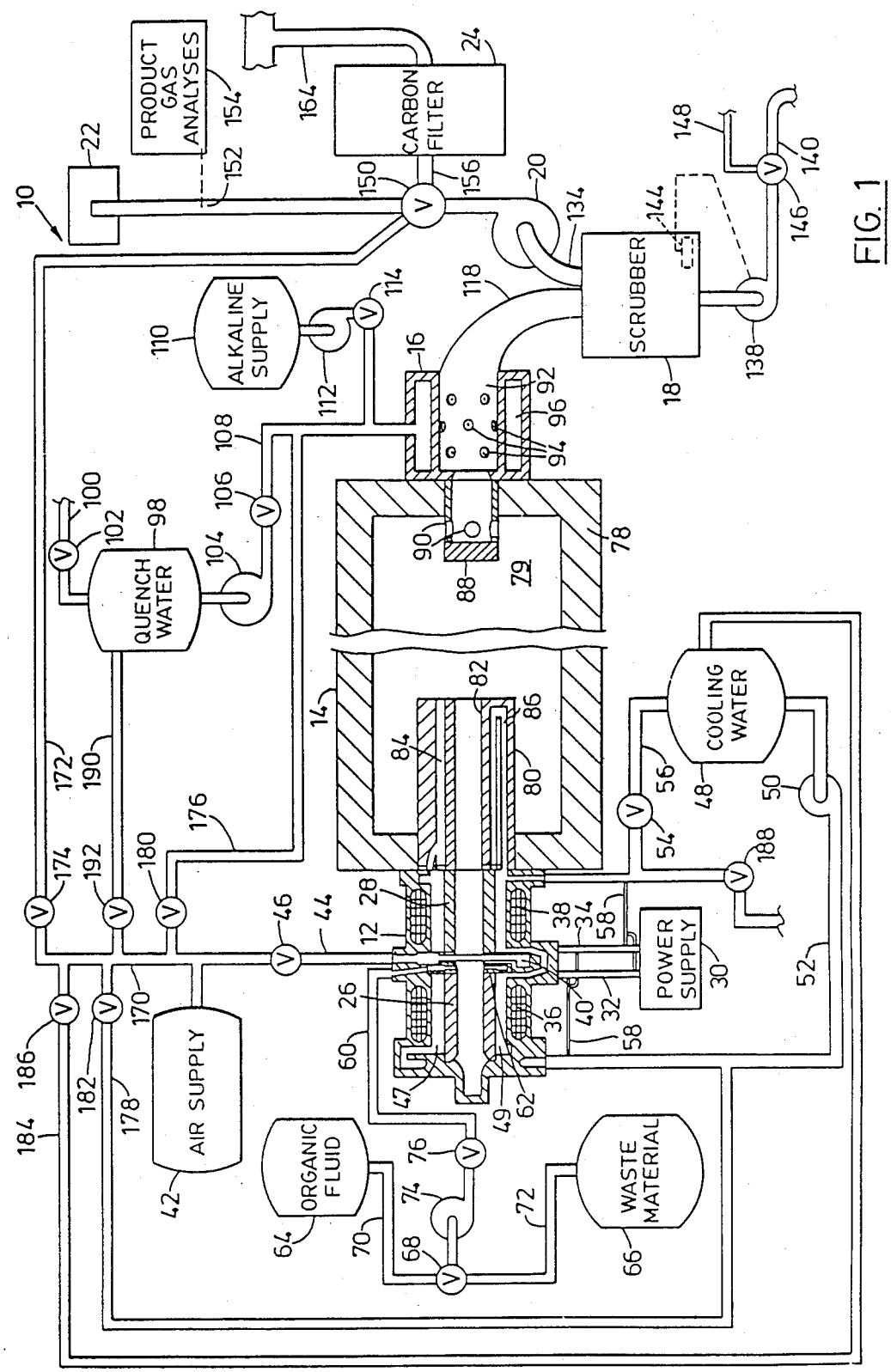
FIG. 1 is a diagrammatic view of the preferred embodiment of the apparatus used for the pyrolytic destruction of waste materials according to the present invention.

Referring to the drawings, and in particular to FIG. 1, the plasma pyrolysis system of the present invention is generally indicated by reference numeral 10. The main components of pyrolysis system 10 include a plasma burner 12 for atomizing and ionizing waste material A reaction vessel 14 receives the atomized and ionized waste material where it is cooled and is recombined into product gas and particulate matter. These recombined products pass out of reaction vessel 14 and through a scrubber 16 where they are quenched and neutralized by a high pressure alkaline spray. The recombined products then are drawn through a scrubber 18 where the product gas is separated from liquid particulate matter. An induction fan 20 then delivers the product gas either to a flare stack 22 to be burned off, or to an activated carbon filter 24. The entire apparatus of plasma pyrolysis system 10 is very compact, in that it can all fit into a 45 foot (13.7 meter) moving van type drop-bed trailer, making pyrolysis system 10 mobile or transportable to any site having toxic waste materials to be destroyed.

Plasma burner 12 has a pair of co-linear hollow electrodes 26, 28 which are connected internally to a suitable power supply 30 through respective electrical cables 32, 34. Power supply 30 is a six pulse thyristor water cooled unit rated at 500 kW and is adapted to be connected to a primary 480 volt, three phase power feed from a commercial service line. Power supply 30 delivers direct current power to electrodes 26, 28 to provide variable plasma output from 200 to 500 kW.

The plasma arc generated by plasma burner 12 is a high temperature plasma (temperatures are in excess of 5000 C and could reach up to 50,000 C), as opposed to a low temperature plasma where an inert gas or a vacuum is required to initiate and sustain the plasma arc The plasma arc in plasma burner 12 is stabilized or collimated by annular electromagnetic field coils 36, 38 which spin the arc. In addition, an annular gap 40 provided between electrodes 26, 28 can be connected to a high pressure gas supply, such as air supply 42, and with a suitable gas admission ring, the high pressure air supply can be used to create a vortex inside plasma burner 12 also to help spin or collimate the arc. Annular gap 40 is shown in FIG. 1 to be connected to air supply 42 by an air supply line 44 having a suitable regulating valve 46. Vortex air is supplied to plasma burner 12 by air supply line 44 with a flow rate as low as 20 standard cubic feet per minute (0.57 cubic meters per minute) and a pressure of 100 psi (690 kPa). This amount of air is insignificant, since it is less than 1 or 2 percent of the stoichiometric air required for the combustion of most organic waste material, so the method is still substantially pyrolytic.

Electrodes 26, 28 and electromagnetic field coils 36, 38 are cooled by circulating cooling water around or through them in cooling passages 47, 49. Cooling passages 47, 49 are connected to a supply of cooling water in a holding tank or reservoir 48, typically 130 gallons (590 liters), which is circulated in a closed circuit at a typical rate of 35 gallons per minute (160 liters per minute) at a typical pressure of 100 psi (690 kPa). A suitable pump 50 is located in the cooling water supply line 52, and a valve 54 is provided in the cooling water return line 56. Valve 54 can be used to control the rate of flow of cooling water, or alternatively, water flow can be constant and a heat exchanger (not shown) can be incorporated into the cooling water return line to control the rate of heat removal by the cooling water circuit. Part of the cooling water is also circulated through cooling jackets on the power supply electrical cables 32, 34 by cooling lines 58 to cool electrical cables 32, 34. Conditioned or de-ionized water is used for cooling.

The construction of plasma burner 12 per se is not considered to be part of the present invention, so will not be described in further detail. However, the basic plasma burner 12 is available from the Westinghouse Electric Corporation of Pittsburgh, Pennsylvania, U.S.A., and its construction is substantially like that shown in U.S. Pat. No. 3,832,519 issued on Aug. 27, 1974.

Waste material is fed to plasma burner 12 through a waste feed line 60 at a rate of approximately one gallon per minute (4.5 liters per minute). Waste feed line 60 is connected to one or more annular inlet rings 62 (only one is shown in FIG. 1) coaxially mounted between the hollow electrodes 26, 28. Waste material flows through inlet ring 62 to be injected directly into the colinear electrode space defined by electrodes 26, 28. It is not necessary to spray or atomize the waste material as it enters plasma burner 12.

Figure 6:
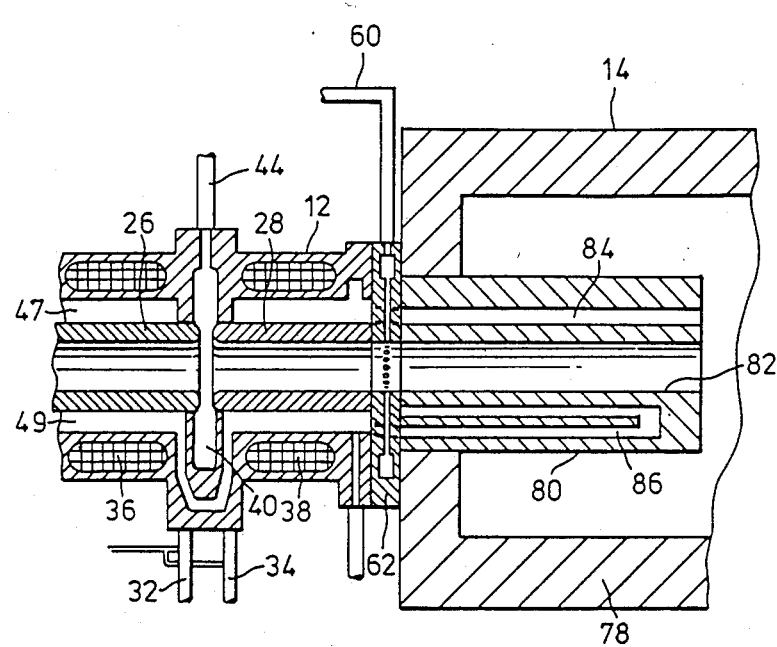
FIG. 6 is a diagrammatic view of a portion of FIG. 1 on an enlarged scale showing another embodiment of a plasma burner as used in the present invention.

FIG. 6 shows another embodiment wherein inlet ring 62 is coaxially located at the outlet end of electrode 28 adjacent to reaction vessel 14. In this embodiment, the waste material is still fed directly into the throat of the plasma arc but downstream of annular gap 40 where the arc is initiated, in case the entry of waste material interferes with the formation or generation of the plasma arc.

The waste feed supply includes two reservoirs 64 and 66. Reservoir 64 contains non-toxic organic fluid such as ethanol which is fed to plasma burner 12 during start up as a precursor feed until the system reaches steady state, and also during shut down of pyrolysis system 10 to flush the system. Reservoir 66 contains the waste material to be destroyed, and in the preferred embodiment, this is in liquid or liquefied form. Reservoirs 64, 66 are connected to a three-way valve 68 through supply lines 70, 72. A variable speed waste feed pump 74 delivers either the non-toxic organic fluid or the waste material to plasma burner 12 through waste feed line 60, and an additional shut-off valve 76 is provided in waste feed line 60 to shut-off the flow of waste material if adverse conditions should arise, as described further below.

Plasma burner 12 is connected to reaction vessel 14 in a suitable manner. Reaction vessel 14 comprises a cylindrical stainless steel housing having a refractory lining 78, and the internal volume of reaction vessel 14 forms a reaction chamber 79 having a volume of approximately 2 cubic meters. Refractory lining 78 is formed of kaolin spun fibre material and is sold under the trade mark KAOWOOL by Babcock & Wilcox Refractories of Burlington, Ontario, Canada. The usual temperature range inside reaction vessel 14 is between 900° and 1200° C. Reaction vessel 14 includes a hollow cylindrical member 80 coaxially mounted to communicate with the plasma burner electrodes 26, 28. Cylindrical member 80 has a hollow inner graphite cylinder 82 to receive and direct the plasma arc into reaction vessel 14. Cooling water passages 84, 86 communicate with cooling water passages 47, 49 in plasma burner 12 to cool the graphite cylinder 82. Cylindrical member 80 is also packed with KAOWOOL refractory material to protect the cooling water passages.

Reaction vessel 14 also includes a graphite hearth or outlet shield 88 axially spaced from graphite cylinder 82. Decaying plasma species emerging from the cylindrical member 80 impinge on graphite outlet shield 88.

Outlet shield 88 includes transverse outlet openings 90 communicating with the hollow center of graphite shield 88 to form the outlet of reaction vessel 14. Transverse outlet openings 90 create enough turbulence to ensure that particulate or ash material formed in the reaction vessel passes out through the reaction vessel outlet.

The area inside plasma burner 12 and graphite cylinder 82 serves as a plug flow atomization zone whereas the inside of the reaction vessel serves as a mixed recombination zone. The residence time inside the atomization zone is typically approximately 500 microseconds, and the residence time inside the recombination zone is typically approximately 1 second.

Spray ring 16 is connected to the reaction vessel outlet to receive product gas and particulate matter emerging therefrom. Spray ring 16 has an inner hollow cylindrical sleeve 92 in which are mounted three annular rows of inwardly directed spray nozzles 94. The circumferential position of each row of spray nozzles 94 is uniformly staggered. Spray nozzles 94 communicate with an annular channel 96 which is filled with high pressure quenching liquid. The spray nozzles 94 atomize this quenching liquid to form a uniform spray of micron sized droplets to quench the product gas and particulate matter passing through spray ring 16. The internal diameter of inner sleeve 92 is approximately 4 inches (10.5 centimeters) and inner sleeve 92 is approximately 10 inches (25.5 centimeters) long. Spray ring 16 is formed of stainless steel.

The spray ring annular channel 96 is connected to a reservoir 98 of high pressure quench water. Reservoir 98 is typically a 30 gallon (136.4 liter) tank and is supplied by a domestic water supply 100 through a suitable valve 102. If desired, an air gap (not shown) can be provided prior to valve 102 to isolate pyrolysis system 10 from the domestic water supply. Quench water in reservoir 98 is supplied to spray ring 16 using a variable speed pump 104 rated at 10 gallons per minute (45 liters per minute) and 150 psi (1,034 kPa). A portion of this flow of quench water can be used for cooling of the thyristor in the power supply prior to rejoining the main flow, although this is not shown in FIG. 1. A valve 106 located in quench water supply line 108 maintains the flow of quench water at a rate of approximately 20 to 40 liters per minute.

An alkaline supply reservoir 110 is provided for adding alkaline material to the quench water fed to spray ring 16. Alkaline reservoir 110 is typically a 55 gallon (250 liter) drum of liquid sodium hydroxide or caustic soda. A variable speed pump 112 rated at 2 gallons per minute (9 liters per minute) and 150 psi (1,034 kPa) delivers the caustic soda through a suitable valve 114 to quench water supply line 108. Sufficient sodium hydroxide is supplied to the quench water to neutralize any acid gases emerging from reaction vessel 14, and for this purpose, the output of pump 112 is controlled by a pH sensor (not shown) monitoring the pH of the quench water appearing in scrubber 18. The term "neutralize" for the purposes of this specification is intended to mean a pH of between 5 and 9 or such other range as is acceptable by the regulatory authorities in the jurisdiction where pyrolysis system 10 is operated.

Figure 2:
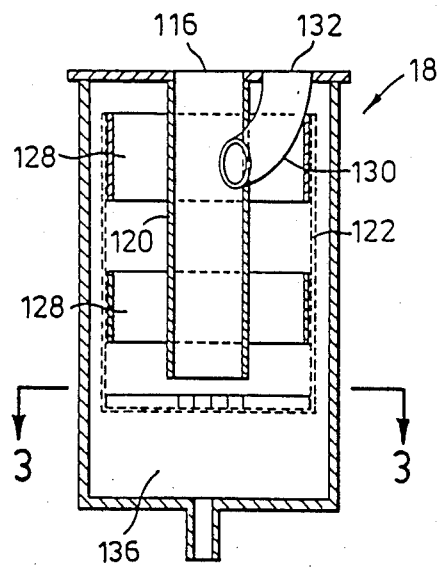
FIG. 2 is a vertical sectional view of the scrubber used in the apparatus of FIG. 1.
Figure 3:
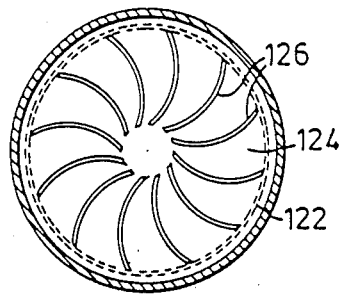
FIG. 3 is a sectional view taken along lines 3—3 of FIG. 2.

Referring next to FIGS. 1, 2 and 3, scrubber 18 is shown having a central inlet 116 which is connected to the output of spray ring 16 through a suitable conduit 118. Scrubber 18 is a cylindrical tank typically about 60 centimeters in diameter and 1 meter in height and is made of stainless steel. Scrubber 18 has a central vertical tube 120 about 12 centimeters in diameter and 70 centimeters in length communicating with scrubber inlet 116. An expanded metal basket 122 is mounted inside scrubber 18. As seen best in FIG. 3, expanded metal basket 122 has a solid bottom plate 124 with a plurality of radially extending curved vanes 126, so that flow of recombined products down through central inlet tube 120 impinges on bottom plate 124 and vanes 126 to be caused to flow in a counterclockwise vortical flow. Expanded metal basket 122 has a pair of circumferential sheet metal baffles 128 vertically spaced apart. In this way, pressure differentials are created across the walls of the expanded metal basket, so that the flow therethrough causes liquid and particulate matter to be separated from product gas in the recombined products. In this sense, scrubber 18 is a mechanical scrubber. The product gas continues flowing upwardly and out through an elbow 130 arranged in the path of the vortical flow. The elbow 130 forms a scrubber outlet 132 which is connected through a suitable conduit 134 (see FIG. 1) leading into the suction side of induction fan 20.

Scrubber 18 has a lower sump 136 where liquid and particulate matter accumulates to be drawn off by a drain pump 138 to be delivered through a discharge line 140 to a sewer or a holding tank for further treatment. A liquid level control 144 is mounted in the sump of scrubber 18 to control pump 138, and a three way valve 146 is provided for directing the liquid and particulate matter to a sampling line 148 if desired.

Induction fan 20 is rated typically at 750 cubic feet per minute (21.2 cubic meters per minute) and it continuously draws on scrubber 18 and reaction vessel 14 to maintain atmospheric to slightly negative pressure in the system. Product gas from scrubber 18 passes through induction fan 20 and is delivered to a three way valve 150. During normal operation of pyrolysis system 10, the flow of product gas passes through valve 150 to flare stack 22 where it is electrically ignited. The gas is mainly hydrogen, carbon monoxide and nitrogen, so it burns with a clean flame at a temperature of about 1800° to 2100° C. The flare stack serves as an air pollution control device to burn off fuel gas and any other trace products. Alternatively, the product gas can be used as fuel gas rather than being burned off in a flare. The product gas being delivered to flare stack 22 is sampled by an appropriate sensor 152 which is connected to product gas analysis equipment 154 as will be described further below.

Figure 4:
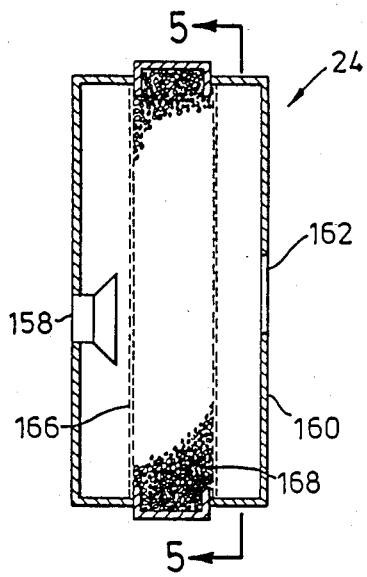
FIG. 4 is a vertical sectional view of the carbon filter used in the apparatus of FIG. 1.
Figure 5:
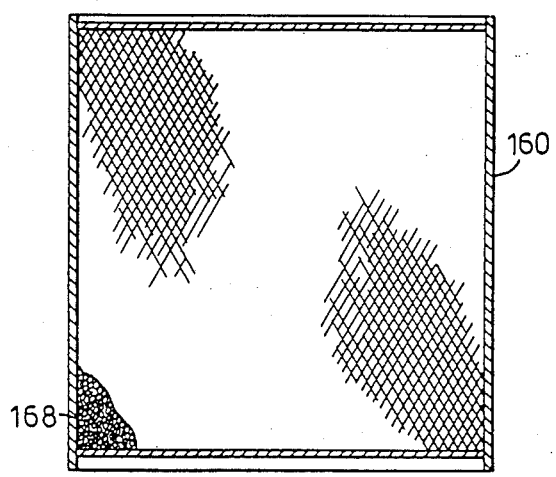
FIG. 5 is a sectional view taken along line 5—5 of FIG. 4.

As seen best in FIGS. 1, 4 and 5, carbon filter 24 is connected to three way valve 150 through an input line 156 leading to an inlet 158 in carbon filter 24. Carbon filter 24 includes a rectangular box or housing 160 having an outlet 162 communicating with a vent pipe 164 (see FIG. 1). Carbon filter 24 includes a central screened compartment 166 filled with activated carbon 168. Carbon filter 24 is approximately 60 centimeters square and 30 centimeters in thickness, with the screened compartment 166 being about 15 centimeters thick. In the event that there is a failure of electrical power, three way valve 150 diverts the flow of product gas from flare stack 22 to carbon filter 24 to block the potential release of any trace undestroyed toxic material in the product gas.

The product gas analysis equipment 154 is provided to ensure that the waste destruction efficiency of plasma pyrolysis system 10 is sufficiently high that any trace toxic or hazardous materials in the product gas will be well below the limits set by regulatory authorities in the jurisdictions where pyrolysis system 10 is operated. It is believed that the combustion in flare stack 22 destroys any such trace hazardous materials in the product gas. However, it is considered to be preferable not to rely on this, but rather, ensure that the product gas itself is within environmentally safe limits. The specific limits for each jurisdiction may vary. In the event that the level of trace hazardous materials detected in the product gas is above the limits set by a particular regulatory authority, product gas analysis equipment 154 will determine this and automatically shut down the waste feed flow until the operating parameters of plasma pyrolysis system 10 are altered appropriately to bring the level of trace hazardous materials within the prescribed limits.

Product gas analysis equipment 154 includes a mass spectrometer in the form of a Hewlett-Packard 5792A gas chromatograph coupled to a Hewlett-Packard 5970A mass selective detector. One sampling technique is to take a 100 liter sample of the product gas and pass same through a heat traced line to a particulate filter to remove any carbon. The cleaned gas is then passed through an absorber with a capture efficiency of about 99%. The absorber is then rapidly heated to release trapped organics. A nitrogen stream carries the organics to the mass spectrometer for analysis. The mass spectrometer scans up to 6 specific masses corresponding to those ions whose presence either indicates the degree of toxic waste destruction or the formation of possible new toxic compounds. If the concentrations of these chemicals exceeds the predetermined limits set by the regulatory authority, waste feed to the plasma burner is stopped. If the concentration limits are not exceeded, the analysis cycle is automatically repeated.

In the event that there could be hazardous trace materials in the product gas which are not specifically scanned for, the mass spectrometer will also scan for compounds having an atomic mass between 200 and 450. This can be extended to a range of 10 to 600 if required by the specific regulatory authority. If unknown compounds are detected having an atomic mass equivalent to that of a hazardous chemical and in an amount above the limits set by the regulatory authority, then the feed of waste material to the plasma burner is also stopped, and automatic shut down procedures are initiated as described further below.

In addition to monitoring the product gas for hazardous materials, a gas chromatographic system is also provided for the on-line analysis of such things as hydrogen, water, nitrogen, methane, carbon monoxide, carbon dioxide, ethylene, ethane, acetylene, propane, propylene, 1-butene and hydrogen chloride. The analysis for hydrogen chloride, for example, in conjunction with an analysis of the liquid particulate matter from scrubber 18, will determine the efficiency of the neutralization of the acid gas hydrogen chloride by spray ring 16.

Referring again to FIG. 1, air supply 42, in addition to providing high pressure air for the vortex of the plasma burner 12, also supplies air for blowing down the water lines, operating three way valve 150 and pressurizing the cooling water reservoir 48 and quench water reservoir 98. Air supply 42 includes a compressor rated at 72 cfm (2.0 cubic meters per minute) and 120 psi (827 kPa), with a 120 gallon (550 liter) pressure tank feeding an air header 170. Conventional air filters, air dryers and pressure regulators (not shown) are employed. Three way valve 150 is operated by an air line 172 and a suitable control valve 174. Three way valve 150 and control valve 174 are set so that during normal operation product gas is delivered to flare stack 22, but in the event of the detection of undesirable materials in the product gas and shut down or a power failure, control valve 174 operates three way valve 150 to pass the product gas through carbon filter 24.

Air pressure lines 176, 178 are provided with respective valves 180, 182 for blowing down the respective quench water supply line 108 and the cooling water supply and return lines 52, 56 for maintenance purposes.

In the event of a power failure or similar malfunction, it is desirable to maintain the flow of the plasma burner cooling water and also the quench water. The cooling water flow is maintained by pressurizing cooling water reservoir 48 using air line 184 and valve 186. Valve 54 closes and a drain valve 188 leading to a sewer or holding tank opens, so that the pressurized cooling water reservoir causes the flow of cooling water to continue at a reduced rate in cooling water supply line 52 until cooling water reservoir 48 is depleted. The flow is maintained long enough to cool down plasma burner 12 because the power to the electrodes would also be stopped (as well as the waste feed). Drain valve 188 controls the flow of cooling water in the event of power failure or shut down, and this flow lasts for approximately 20 minutes which is sufficient to cool the key components after shut down to enable maintenance operations to take place.

The quench water reservoir 98 is pressurized using an air line 190 and a valve 192. In the event of a power failure or similar malfunction, valve 102 would close and valve 106 would remain open, so that the flow of quench water would continue into spray ring 16 until the quench water reservoir 98 is depleted. Again, however, quench water reservoir 98 contains sufficient water to quench all of the recombined products passing through spray ring 16 that may be created after plasma burner 12 stops operating. It should be noted that the inertia of induction fan 20 makes it continue operating for a short period to evacuate reaction vessel 14, spray ring 16 and scrubber 18 even in the event of a power failure.

Plasma pyrolysis system 10 is sufficiently compact that it can be installed inside a closed 45 foot (13.7 meter) moving van type drop-bed trailer. In addition, a fully instrumented and monitoring equipped control room can also be located inside the trailer space, so that the entire system is mobile and can be easily transported to the disposal site of the waste material. All that is required is that the trailer be hooked up to an appropriate power supply, domestic water supply and a sewer drain or holding tank where this may be required by the particular regulatory authority. Of course, if it is desired to use the product gas as fuel gas rather than burning it off in the flare stack, an appropriate connection can be made to receive the product gas for this purpose.

Prior to operating plasma pyrolysis system 10, it is useful although optional to predict what recombined products will be produced in reaction vessel 14 for any given waste material to be destroyed. Since plasma burner 12 virtually completely atomizes or ionizes the waste material, the new compounds which are created in reaction vessel 14 as a result of the recombination of these atoms and ions is predictable based on kinetic equilibrium. The minimization of Gibb's free energy is used to determine the equilibrium concentrations of product species for a wide range of selected temperatures and pressures. In the event that any undesirable products are predicted to recombine in reaction vessel 14, the waste feed input or operating conditions can be altered to avoid the production of these undesirable products. For example, if carbon tetrachloride is the waste material to be destroyed, it is possible to produce phosgene gas under certain temperature and pressure conditions. However, this can be avoided simply by adding another hydrocarbon to the waste material feed. Often, it is only necessary to add water to the waste material feed to increase the amount of hydrogen available for recombination. Another example of an undesirable product would be hydrofluoric acid being produced in reaction vessel 14 as could occur if a fluorocarbon is the waste material. Further examples of undesirable products and the minimization or elimination of same through altering the content of the waste feed material or the operating conditions will be apparent to persons skilled in the art.

In addition to predicting the composition of the recombined products to be formed in reaction vessel 14, it is also useful to predict the change in enthalpy between the waste material to be destroyed and the recombined products. This enables a prediction to be made as to the plasma energy required to destroy the wastes. This in turn can be used to calculate the initial setting of voltage and current to be supplied to the electrodes of the plasma burner. It will be appreciated that the enthalpy of the recombined products is a function of the temperature and pressure in the reaction vessel 14, and that this can be changed by altering the feed rate of waste material or the power input to the plasma burner. Accordingly, initial settings of waste material feed rate and plasma burner power input can be predicted to achieve the results desired.

It will also be appreciated that there is a small amount of vortex air being injected into the plasma burner 12 through air supply line 44. The input of this vortex air should be considered in calculating the change in enthalpy occuring in the system. The amount of vortex air injected into the plasma burner is relatively insignificant in that it is at most only 1 to 2% of the stoichiometric oxygen demanded by the waste material for combustion. For this reason, waste destruction according to the present invention and for the purposes of this specification is considered to be pyrolytic. It will also be appreciated that heat losses in the plasma burner and reaction vessel can be taken into account in setting the initial voltage and current for the plasma burner.

In operation, after the predictions in respect of recombined products have been made and adjustments are made to the waste feed material so that no undesirable products are anticipated, the change in enthalpy predictions are made to determine the initial plasma burner power settings and waste material feed rates. Air supply 42 is made operational to pressurize the quench water reservoir 98 and the cooling water reservoir 48 (after these reservoirs have been filled with water). The cooling water pump 50, the quench water pump 104 and the scrubber drain pump 138 are powered. Power is applied to the plasma burner and the vortex air supply line 44 is opened. The alkaline supply pump 112 is then powered and a suitable feed rate of caustic soda is supplied to the quench water. Waste feed to the plasma burner is then commenced from organic fluid reservoir 64. Adjustments are made to the plasma vortex air, the waste feed and the caustic feed as necessary. When the system has reached steady state, which only takes about three minutes, the waste feed is switched over to the waste material in waste material reservoir 66.

It will be appreciated from the above that the waste material being fed into plasma burner 12 is subjected to a high temperature plasma arc to atomize and ionize this waste material. This occurs at temperatures in excess of 5,000° C. The atomized and ionized waste material then passes through graphite cylinder 82 into reaction chamber 79 where it is recombined into recombined products including product gas and particulate matter. This is done at a temperature between 900° and 1200° C. in accordance with the change in enthalpy predicted for the final state of the reactant products in reaction chamber 79. In this sense, and for the purposes of this specification, the atomized and ionized waste material is cooled in reaction chamber 79 to form the equilibration recombined products. It will be appreciated that some of the recombining reactions in reaction chamber 79 will be endothermic and some will be exothermic, so that all of the atomized and ionized waste material may not be "cooled" in the strict sense in reaction chamber 79. The term "cooling" for the purposes of this specification is intended to include all the reactions and combinations whatever occurring to the atomized and ionized waste material in reaction chamber 79.

The recombined products in reaction chamber 79 then pass out of reaction vessel 14 and through spray ring 16 where they are quenched to a temperature of about 80° C. by spraying them with the alkaline atomized spray to neutralize them and wet the particulate matter. The quenched recombined products then pass into scrubber 18 where the product gas is extracted from the recombined products leaving liquid particulate matter such as salts and carbon in solution. This solution or liquid particulate matter is then pumped off to a drain or holding tank and the product gas is passed by induction fan 20 to flare stack 22 or it is used as fuel gas. As mentioned above, the pressure in reaction chamber 79 is atmospheric or slightly negative caused by induction fan 20 drawing the recombined products out of reaction vessel 14. The temperature in reaction chamber 79 can be controlled by adjusting either the power input to plasma burner 12 or the feed rate of the waste material.

In the event that it is desired to shut down plasma pyrolysis system 10, three way valve 68 is immediately activated to switch over to the non-hazardous organic fluid feed to flush the system. This could also occur if any of the other operating parameters of the system exceed their normal operating ranges. After the system has been flushed with non-hazardous organic fluid, the organic fluid is stopped, power is removed from the plasma burner and plasma vortex air is shut off. When the temperature in reaction chamber 79 reaches an acceptable level, induction fan 20 is shut off as well as the flow of quench water to the spray ring 16. When the temperatures inside plasma burner 12 have reached a suitable level, the cooling water pump 50 is shut down, and thereafter the air supply compressor 42 can be shut down if desired.

In the event of a power failure or the loss of the plasma arc in plasma burner 12, or the detection of unacceptable materials in the product gas in flare stack 22 or the loss of the induction fan 20, or the loss of the plasma cooling water flow, shut off valve 76 immediately closes to shut off the feed of waste material. As mentioned above, if there is a power failure, three way valve 150 automatically diverts the flow of product gas from flare stack 22 to carbon filter 24 to trap any hazardous materials contained therein before they are released to the environment. This also occurs in the event of a loss of the plasma arc in plasma burner 12. In either case, vortex air flow to the plasma burner is terminated to increase the residence time of the recombined products inside reaction chamber 79. Also as mentioned above, the pressurized water reservoirs 48 and 98 continue cooling the plasma burner and quenching the recombined products in the spray ring. Even in the event of a power failure, induction fan 20 continues to operate for about one minute, which is sufficient to evacuate recombined products from reaction chamber 79.

It should be noted that under all operating and shut down conditions, the pressure in the water cooling system is much greater than the pressure in the waste feed system, in the vortex air system, or in the reaction vessel. Thus, should a water or waste feed leak occur, the water reservoir will not become contaminated with waste materials.

Having described preferred embodiments of the invention, it will be appreciated that various modifications may be made to the method and apparatus described. For example, it is not necessary to feed the waste material directly into the throat of the arc of the plasma burner. The waste material could be inserted into the reaction chamber and the plasma arc introduced into the chamber to impinge on the waste material. However, this would reduce the residence time of the waste material in the plasma arc, so it may not be as effective for some waste materials. In the preferred embodiment, liquid waste materials or liquefied waste materials have been used. However, suitable modifications could be made to the waste feed system to accommodate solids or composite liquids and solids. This could even include non-organic material. The plasma arc would simply melt and slag or vaporize the non-organic material allowing the hazardous organic component to be destroyed as described above without any reduction in efficiency. A common example of such a composite material would be PCB filled capacitors.

It will be apparent to persons skilled in the art that the plasma pyrolysis system shown in the drawings is only a schematic or diagrammatic representation of the system. Additional valves, different types of valves, various temperature, pressure and flow sensors and other usual process control components would be employed in an actual installation.

It is not necessary to carry out the predictions in respect of the expected recombined products or the change in enthalpy as described above before operating plasma pyrolysis system 10. The system could be made operational to steady state conditions using a non-toxic or non-hazardous waste material, and thereafter, the toxic wastes could be substituted and would be destroyed. However, it should be apparent to any person skilled in the art that certain toxic wastes could recombine into undesirable recombined products such as hydrofluoric acid, and that these waste materials or completely unknown waste materials should not be treated in plasma pyrolysis system 10 unless they have been analysed and their destruction modelled or predicted beforehand or suitable precaution are taken to avoid the formation of expected undesirable products.

Finally, it is not essential that product gas analysis or liquid particulate matter analysis be carried out, especially if plasma pyrolysis system 10 is used to treat known waste materials on a regular or consistent basis.

The monitoring and analysis procedures are provided primarily to satisfy regulatory authorities which often demand excessive "failsafe" operations during the assessment of new technology.

From the above, it will be appreciated that the plasma pyrolysis waste destruction system of this invention is a simple, compact and mobile system that is capable of operating commercially within acceptable environmental limits for many hazardous or toxic chemical waste materials, and for the materials that cannot be destroyed within acceptable environmental limits, the system is capable of determining this before any toxic material is released to the environment.

What we claim as our invention is:

1. A method for the pyrolytic destruction of waste material, comprising the steps of:
    (a) fedding waste material through a feed line to a plasma burner having hollow electrodes defining a co-linear electrode space;
    (b) introducing the waste material directly into a plasma arc having a temperature in excess of 5,000° C., in said colinear electrode space under substantially pyrolytic conditions to atomize and ionize the waste material, said plasma arc being generated by a plasma burner, said plasma burner receiving power input from a power supply;
    (c) cooling the atomized and ionized waste material in a reaction chamber to form recombined products including product gas and particulate matter;
    (d) quenching the recombined products with an alkaline atomized spray to neutralize the recombined products and wet the particulate matter;
    (e) extracting the product gas from the recombined products; and
    (f) burning the extracted product gas.

2. A method as claimed in claim 1, wherein the temperature in the reaction chamber is controlled by adjusting the power input to the plasma arc.

3. A method as claimed in claim 1, wherein the temperature in the reaction chamber is controlled by adjusting the feed rate of the waste material.

4. A method as claimed in claim 1, wherein the content of the recombined products is monitored and the feeding of waste material is stopped in the event that hazardous constituents are detected in quantities above predetermined limits.

5. A method as claimed in claim 2, wherein the temperature in the reaction chamber is controlled to be within the range of 900° C. and 1200° C.

6. A method as claimed in claim 3, wherein the temperature in the reaction chamber is controlled to be within the range of 900° C. and 1200° C.

7. A method as claimed in claim 1 wherein the theoretical composition of the recombined products is initially determined, then the content of the waste material to be destroyed is altered if undesirable products are determined.

8. A method as claimed in claim 1, wherein the theoretical change in enthalpy between the waste material to be destroyed and the recombined products is initially determined and the plasma power input is set to produce said change in enthalpy.

9. A method as claimed in claim 1, wherein the change in enthalpy between the waste material to be destroyed and the recombined products is initially predicted and the rate of feeding of the waste material is set to produce said change in enthalpy.

10. A method as claimed in claim 1, wherein recombined products are removed from the reaction chamber prior to quenching same.

11. A method as claimed in claim 10 wherein the recombined products are removed from the reaction chamber by drawing same therefrom using an induction fan.

12. A method as claimed in claim 1 wherein the pressure in the reaction chamber is approximately atmospheric.

13. A method as claimed in claim 10 wherein the product gas is extracted from the recombined products by drawing said recombined products through a mechanical scrubber.

14. A method as claimed in claim 1 wherein the waste material is a hazardous material, and further comprising the step of initially carrying out the method using a non-hazardous material until operating conditions reach steady state.

15. A method as claimed in claim 4, wherein non-hazardous organic material is fed into the plasma arc in the event that the feeding of waste material is stopped.

16. A method as claimed in claim 4, wherein the product gas is passed through an activated filter in the event of a loss of the plasma arc.

17. A method as claimed in claim 1 wherein the recombined products are quenched to a temperature of 80° C.

18. Apparatus for the pyrolytic destruction of waste materials, the apparatus comprising:
a plasma burner including at least two co-linear hollow electrodes defining a co-linear electrode space and means for stabilizing a plasma arc having a temperature in excess of 5,000° C. therebetween;
a power supply connected to the electrodes to produce said plasma arc, and cooling means for cooling said electrodes;
a reaction vessel connected to the plasma burner and having a refractory lined reaction chamber for receiving said plasma arc;
means for inserting waste material directly into said plasma arc in said co-linear electrode space to be atomized and ionized under substantially pyrolytic conditions and then recombined into recombined products in the reaction chamber;
the reaction vessel including an outlet for removing said recombined products therefrom;
a spray ring communicating with the reaction vessel outlet;
a pressurized supply of alkaline fluid connected to and communicating with the spray ring for quenching and neutralizing said recombined products;
a scrubber communicating with the output of the spray ring for separating product gas from liquid particulate matter in the recombined products; and
means coupled to the scrubber for removing said liquid particulate matter and product gas therefrom.

19. Apparatus as claimed in claim 18 wherein the means for inserting waste material into the plasma arc has an annular inlet ring coaxially mounted between the hollow electrodes for injecting the waste material directly into the plasma arc.

20. Apparatus as claimed in claim 18 wherein the reaction vessel has a hollow graphite cylinder coaxially mounted to communicate with the plasma burner electrodes to receive the plasma arc emerging from the plasma burner.

21. Apparatus as claimed in claim 20 wherein the reaction vessel has a graphite outlet shield axially spaced from the plasma burner to receive the plasma arc, the outlet shield having transverse outlet openings defining the reaction vessel outlet.

22. Apparatus as claimed in claim 18 wherein the spray ring has a hollow cylindrical sleeve containing a plurality of inwardly directed spray nozzles communicating with the supply of alkaline fluid for atomizing said alkaline fluid to quench said recombined products.

23. Apparatus as claimed in claim 18 wherein the scrubber has vanes and baffles interposed in the flow of recombined products to separate the producer gas from the liquid particulate matter.

24. Apparatus as claimed in claim 18 wherein the means for removing said liquid particulate matter and product gas from the scrubber is an induction fan for delivering product gas from the scrubber.

25. Apparatus as claimed in claim 18 further comprising means for determining the theoretical composition of the recombined products for a given waste material to be inserted into the plasma arc.

26. Apparatus as claimed in claim 24, and further comprising means for monitoring the composition of the product gas delivered by the induction fan, and wherein the means for inserting waste material into the plasma arc has a valve, the monitoring means being operatively connected to the valve for shutting off the insertion of waste material in the event that hazardous constituents are detected in the product gas above predetermined limits.

27. Apparatus as claimed in claim 24, further comprising an activated carbon filter, and valve means connected between the induction fan and the carbon filter, the valve means being operable upon an electrical power failure to direct the flow of product gas through the carbon filter.

28. Apparatus as claimed in claim 18 wherein the cooling means for cooling the electrodes has a water holding tank, closed circuit conduit in communication with the plasma burner electrodes and the holding tank, and a pump for circulating cooling water through the closed circuit to cool the electrodes.

29. Apparatus as claimed in claim 28 wherein the cooling means further comprises means for pressurizing the holding tank, and valve means operable upon a power failure for continuing the flow of cooling water.

30. Apparatus as claimed in claim 28 wherein the cooling means uses de-ionized cooling water.

31. Apparatus as claimed in claim 18 wherein the pressurized supply of alkaline fluid is supplied to quench water; said quanch water being supplied from a pressurized supply of quench water, and valve means operable upon a power failure for continuing the flow of quench water to the spray ring.

* * * * *